United States Patent

[11] 3,551,595

[72] Inventor Gerard Hopper
Champaign, Ill.
[21] Appl. No. 768,635
[22] Filed Oct. 18, 1968
[45] Patented Dec. 29, 1970
[73] Assignee The Magnavox Company
Fort Wayne, Ind.
a corporation of Delaware

[54] OPTICAL SYSTEM FOR FACSIMILE SCANNER
9 Claims, 11 Drawing Figs.
[52] U.S. Cl........................................ 178/7.1,
178/7.6
[51] Int. Cl........................................ H04n 1/06
[50] Field of Search............................ 178/7.6,
7.1E, 7.1

[56] References Cited
UNITED STATES PATENTS
2,997,539  8/1961  Blackstone.................. 178/7.6
3,475,553  10/1969  Reese et al.................. 178/7.6
3,487,224  12/1969  Beckmann.................... 178/7.6

*Primary Examiner*—Richard Murray
*Assistant Examiner*—Richard P. Lange
*Attorney*—Richard T. Seeger ABSTRACT: An optical system for the light path in the scanner of a facsimile scanner is mounted in a compact, rotary housing. The housing has a longitudinal bore and two light openings extend along a common diameter between the bore and the sides of the housing. A plastic lens having a flat aperture surface and a convex surface is mounted in the bore. A plastic prism having two reflecting surfaces is mounted in the bore and on the plastic lens. Light entering the two light openings is reflected by the two reflecting surfaces to the lens aperture surface, and is focused by the convex surface at a selected location.

PATENTED DEC 29 1970 3,551,595

INVENTOR
GERARD DE VRIES

BY Jeffers and Young
ATTORNEYS

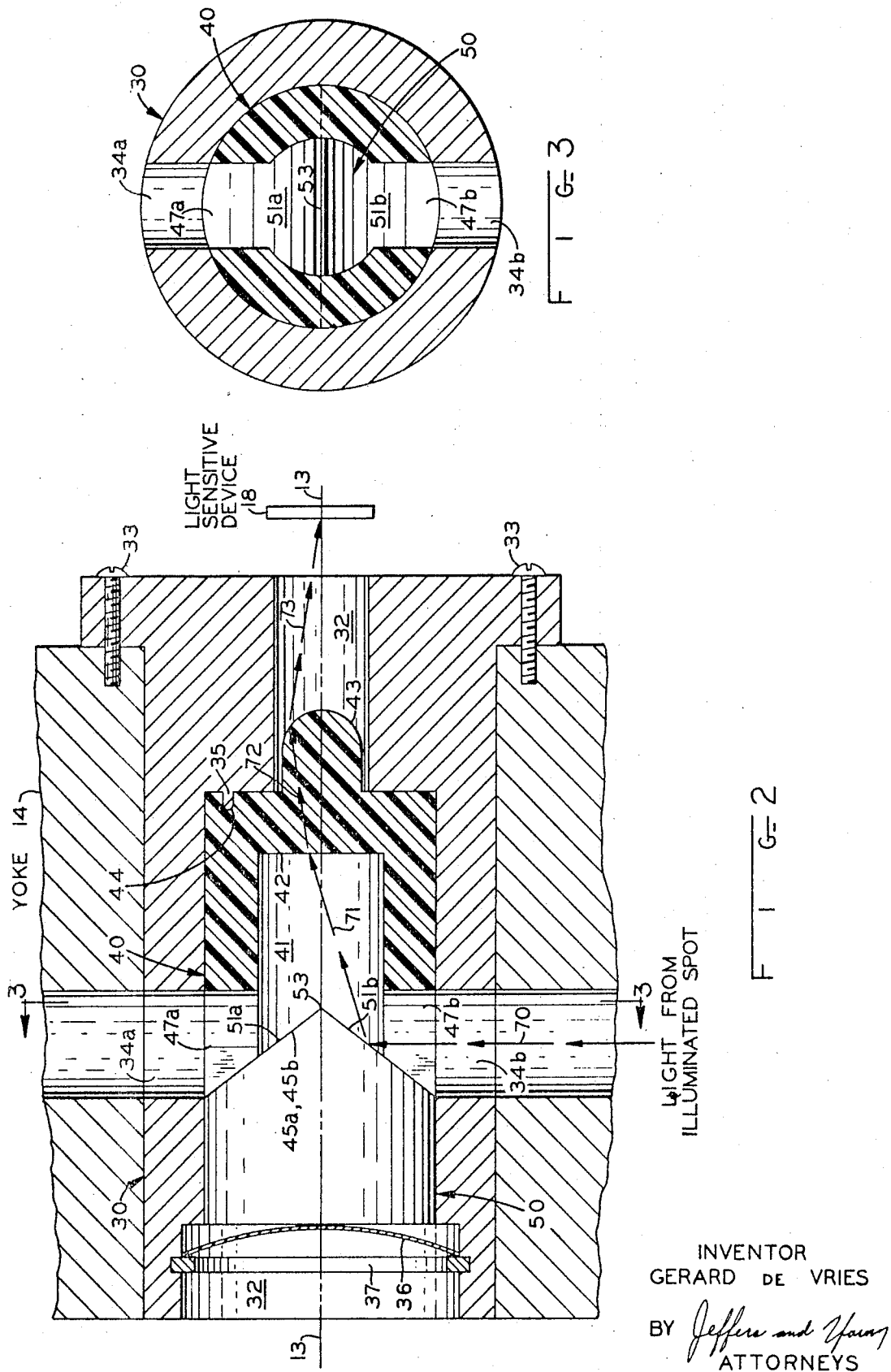

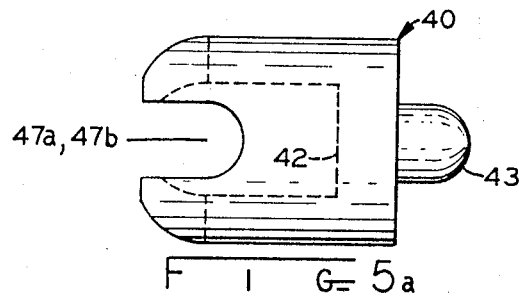
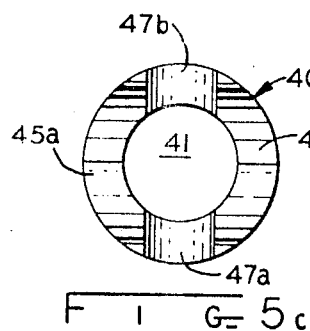 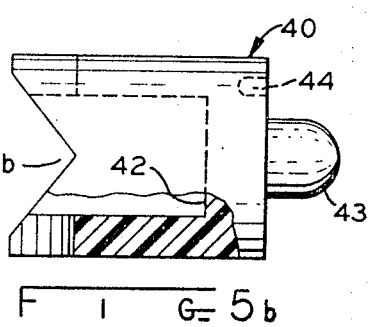 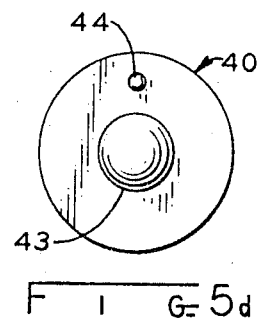
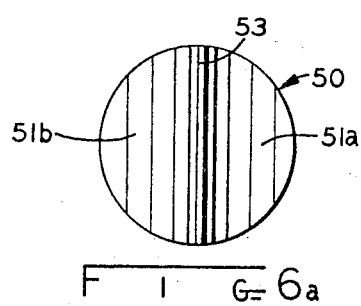
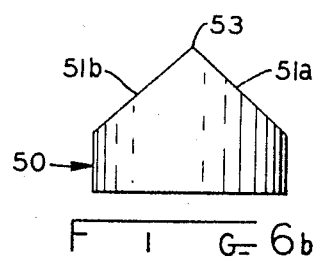 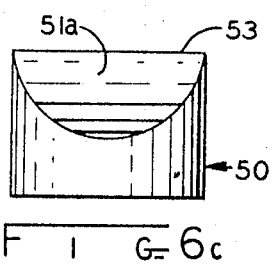
INVENTOR
GERARD DE VRIES

OPTICAL SYSTEM FOR FACSIMILE SCANNER

BACKGROUND OF THE INVENTION

My invention relates to an improved optical system for facsimile scanners, and particularly to such an optical system for facsimile scanners which utilize a moving spot of light on a document which is to be scanned.

In one type of facsimile scanner, a beam of light is rotated about an axis to provide a spot of light that moves in one direction on the document being scanned and the document is moved along the axis, so that the document can be completely scanned by the spot of light. In such a scanner, it is necessary that an optical system be provided to direct the spot of light on the document to a light sensitive device, which is usually stationary. The light sensitive device converts the light energy into a usable electrical signal. The electrical signal is sent to a facsimile receiver which converts the signal into appropriate form for reproducing the scanned document. Typically, the scanner optical system has a lens system which rotates in synchronism with the spot of light, and which directs the spot of light to a reflecting surface. The reflecting surface rotates with the lens system so that light passing through the lens system is reflected and directed to the light sensitive device. The resolution of the scanner, that is the details of the document that are scanned and transformed into an electrical signal, is dependent, among other things, upon how small the spot of light can be maintained. Since the lens system and the reflecting surface must rotate in synchronism with the spot of light, the optical accuracy and position of the lens system and the reflecting surface are relatively critical. Therefore, the lens system and reflecting surface must be accurately designed, and must be constructed so that they maintain their accuracy under relatively adverse field conditions. If any element in the lens system or the reflecting surface loses its adjustment, it is usually necessary that the scanner be returned to a repair center or factory in order that it can be readjusted with the proper equipment.

Accordingly, a primary object of my invention is to provide an improved optical system for facsimile scanners having a spot of light that rotates on a document being scanned for transmission.

Another object of my invention is to provide an improved facsimile scanner optical system that is relatively compact and easy to manufacture.

Another object of my invention is to provide an improved facsimile scanner optical system that is inherently accurate and that keeps its adjustment.

Another object of my invention is to provide an improved facsimile scanner optical system having rotating optical elements positioned at the center of revolution so that the optical elements have the lowest possible linear velocity.

Still another object of my invention is to provide an improved scanner optical system that has a relatively high overall accuracy so that a relatively small light sensitive device may be used.

SUMMARY OF THE INVENTION

Briefly, these and other objects are achieved in accordance with my invention by a housing that is positioned on the central longitudinal axis of the facsimile scanner and that rotates in synchronism with the scanning spot of light. The housing has a longitudinal bore and one or more transverse light openings between the bore and housing sides. An optical lens having a flat aperture surface and a convex focusing surface is positioned in the bore. One or more reflecting surfaces is positioned in the bore and on the lens for reflecting the spot of scanning light that passes through the light openings along the longitudinal axis toward the flat aperture surface. The light reaching the flat aperture surface is focused by the convex focusing surface at a selected location on the longitudinal axis. A fixed light sensitive device positioned at this selected location converts the light energy into electrical signals. The housing, the lens, and the reflecting surface are formed with surfaces which interfit so that when the lens and reflecting surface are positioned in the housing bore, they can be firmly held so that they keep their adjustment.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

FIG. 2 shows a longitudinal cross-sectional view of an improved optical system in accordance with my invention for use in the scanner of FIG. 1;

FIG. 3 shows a cross-sectional view of the optical system in accordance with my invention taken along the line 3–3 of FIG. 2;

FIGS. 5a through 5d shows various views of a lens used in my improved optical system of FIGS. 2, 3, and 4; and FIGS. 6a through 6c shows various views of a reflecting prism used in my improved optical system of FIGS. 2, 3, and 4.

DESCRIPTION OF THE PREFERRED EMBODIMENT

Figure 1:
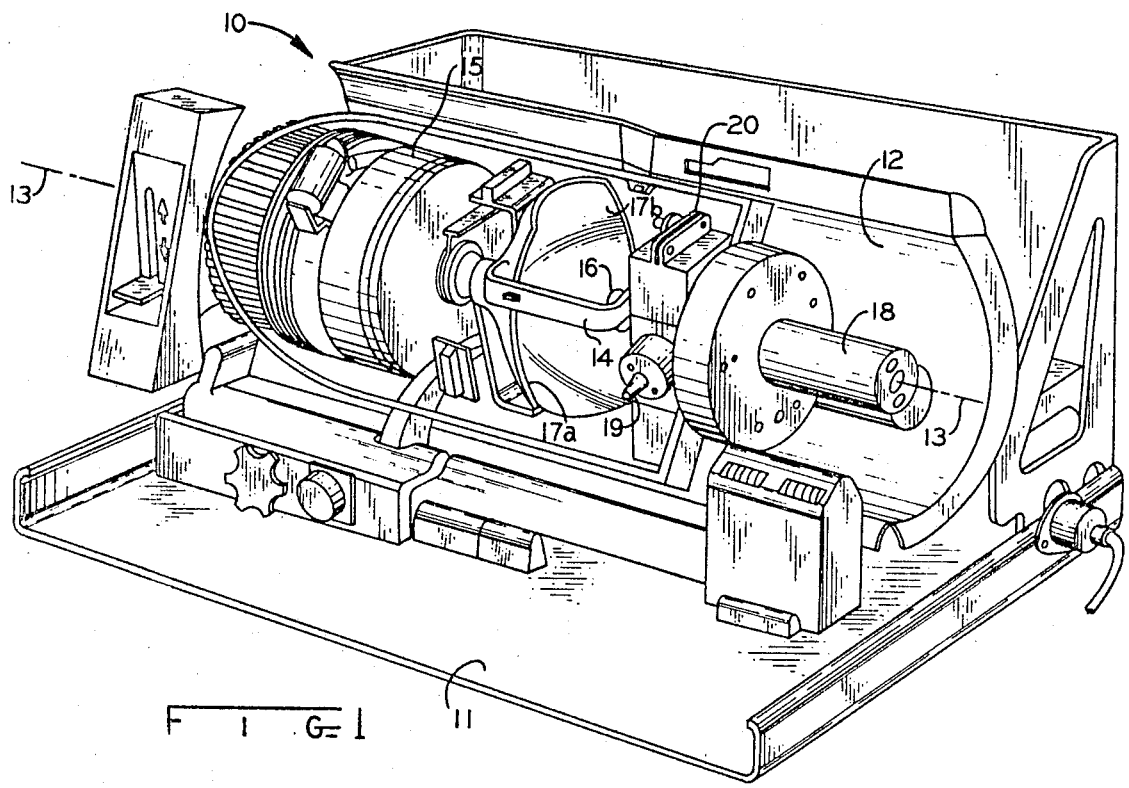
FIG. 1 shows a perspective view of a facsimile scanner which can utilize my improved optical system.

In FIG. 1, I have shown a facsimile scanner 10 which can utilize my improved optical system. The scanner 10 shown in FIG. 1 may also include receiving apparatus for transforming electrical signals into markings on a sheet of paper so as to reproduce a document being scanned at a distant location. The facsimile scanner 10 is mounted on a suitable base 11 which supports a concave cylindrical platen 12 that extends horizontally along the base 11 and that receives the document to be scanned. The platen 12 includes means for moving the document being scanned parallel to a longitudinal axis 13 of rotation. A yoke 14 is mounted for rotation about the longitudinal axis 13, and is rotated by a synchronous electric motor 15. An incandescent lamp 16 and two concave reflecting mirrors 17a, 17b are mounted on the yoke 14 to provide two beams of light. Each of these beams is focused by a respective concave mirror 17a, 17b to a spot that is spaced from the longitudinal axis 13 by a distance equal to the radial distance between the axis 13 and the platen 12. The two spots are thus located at the ends of a common diameter which rotates about the axis 13 as a center. Since the platen 12 is less than a half of a cylinder, only one spot is present on the platen 12 at any instant. The two spots alternately sweep or scan over the platen 12 and the document positioned on the platen 12. At the same time that the spots scan the document, the document is moved parallel to the longitudinal axis 13 at a slower speed so that the spots can scan the entire document. In the scanner 10 shown in FIG. 1, the document is moved on the platen 12. But it is to be understood that the document can be held stationary and that the spots of light can rotate about the axis 13 and can also move parallel to the axis 13 to obtain a complete scan of a document.

The moving spots of light illuminate a small area of the document being instantaneously scanned. The amount of light reflected from this small area of illumination indicates whether the particular area on the document is light, dark, or some intermediate shade. This reflected light must be directed to a light sensitive device 18 which converts the reflected light energy into an electrical signal which can be transmitted to a distant location for utilization and reproduction of the document. The reflected light is directed toward the axis 13 by a pair of pickup lenses 19 which are also mounted on the yoke 14 to rotate in the proper relation relative to the spot. Light from the pickup lenses 19 is directed along the axis 13 by an optical system in accordance with my invention. This optical system is carried in a housing 30 which is also mounted on the yoke 14. If the machine of FIG. 1 is to be used to produce documents, a stylus 20 may be mounted on the yoke 14 to write on a sheet of paper in response to electrical signals produced by a scanner. Except for the housing 30 and the optical system in accordance with my invention, the machine of FIG. 1 as described thus far is known in the art.

In FIGS. 2 and 3, I show detailed views of the housing 30 and the optical system in accordance with my invention. The housing 30 is a generally cylindrically shaped member formed of metal or plastic, and has a cylindrical bore 32 extending longitudinally between its ends. As shown in FIG. 2, the bore 32 has several diameters: a large diameter at the left end, an intermediate diameter between the ends, and a small diameter at the right end. The housing 30 is symmetrically positioned on the longitudinal axis 13 and fastened to the yoke 14 by means such as machine screws 33. The housing 30 is provided with two side openings 34a, 34b which lie along a diameter of the housing 30 and extend through the wall of the housing 30 at substantially a right angle to the longitudinal axis 13 of the scanner 10. A lens member 40 is positioned in the bore 32 at its intermediate diameter portion. The lens member 40 is generally cylindrical in shape, and is symmetrically positioned on the longitudinal axis 13. The lens member 40 may be made of any suitable optical material. Such material may include a transparent plastic, such as plexiglass for example. The lens member 40 has a cylindrical hole 41 extending from its left end toward its right end, and terminating to form an aperture surface 42. At the right end, the lens member 40 is provided with a projection 43 having a reduced diameter and ending in a hemispherical surface that forms a convex focusing lens. The lens member 40 also has a locating hole 44 positioned at the end near the projection 43. The locating hole 44 receives an indexing pin 35 positioned in the interior of the housing 30. At the left end, the lens member 40 is provided with two diametrically oriented V-shaped notches 45a, 45b for receiving and positioning a reflecting prism 50. At the same left end, the lens member 40 is also provided with diametrically positioned light openings 47a, 47b which are positioned along a diameter of the lens member 40 that is perpendicular to the diameter on which the notches 45a, 45b are oriented. With the lens member 40 positioned in the housing 30 so that its locating hole 44 mates with the indexing pin 35, the light openings 47a, 47b of the lens member 40 are aligned with the side openings 34a, 34b of the housing 30. This can be seen in FIG. 3. The reflecting prism 50 is cylindrically shaped and may be made of any suitable material. The prism 50 is symmetrically positioned on the longitudinal axis 13. The prism 50 has two accurately positioned and formed plane reflecting surfaces 51a, 51b which extend from a vertex 53 positioned on the axis 13 (and at equal angles with respect to the axis 13) outward toward the sides. The reflecting surfaces 51a, 51b are coated with a good optical reflector, which may be applied by any suitable method. The respective angles of the two reflecting surfaces 51a, 51b are made as precisely equal as possible to the two angles forming the V-shaped notches 45a, 45b in the lens member 40. The lens member 40 rests against the surface between the intermediate and right end portion of the bore 32, and the reflecting prism 50 rests in the V-shaped notches 45a, 45b. The lens member 40 and the prism 50 are held by a spring member 36 that is compressed and held by a locking ring 37 snapped into a groove at the left end of the bore 32.

Figure 4:
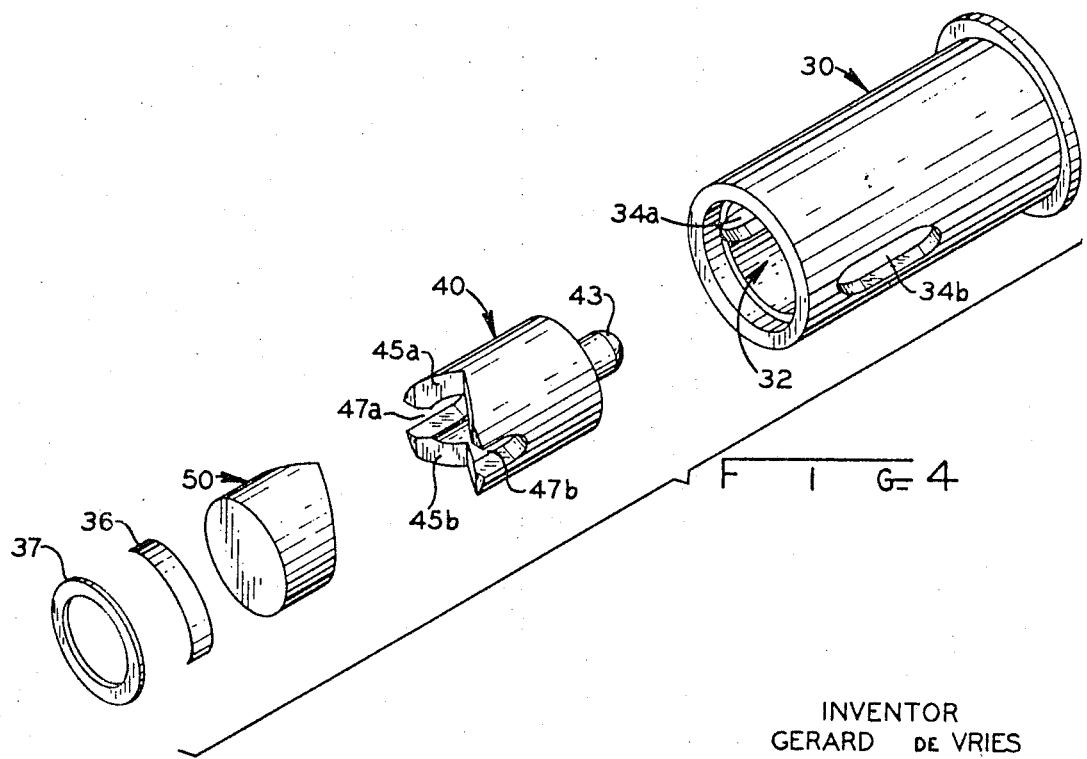
FIG. 4 shows an exploded perspective view of the improved optical system of FIGS. 2 and 3.

FIG. 4 shows a perspective view of the elements and my housing in a disassembled position. When the elements are assembled into the housing 30, the lens member 40 is positioned in the bore 32 so that its locating hole 44 mates with the pin 35. This insures that the light openings 47a, 47b of the lens member 40 are aligned with the side openings 34a, 34b of the housing 30. The reflecting prism 50 is then positioned in the bore 32 so that its reflecting surfaces 51a, 51b fit into the respective notches 45a, 45b thus insuring that the reflecting surfaces 51a, 51b are properly positioned to receive light which passes through the openings 34a, 34b, 47a, 47b. The lens member 40 and the reflecting prism 50 are then held by the spring member 36 which is compressed against the bottom of the reflecting prism 50 by the locking ring 37 which is fitted into the groove in the bore 32. When the elements have been assembled in the housing 30 in the manner just described, the assembly provides a compact and stable structure which, as will be explained, provides an improved optical path.

FIGS. 5a through 5d show more detailed views of the lens member 40, and particularly the arrangement and orientation of the light openings 47a, 47b and the V-shaped notches 45a, 45b. FIG. 5a shows a top plan view, FIG. 5b shows a side elevation view, FIG. 5c shows a view from one end, and FIG. 5d shows a view from the other end. In particular, FIG. 5c shows how the light openings 47a, 47b are oriented along a diameter which is at right angles with respect to the diameter on which the V-shaped notches 45a, 45b are oriented. As mentioned, the lens member 40 may be made of suitable optical material, such as glass or transparent plastic. When this material is cast, or molded, it should be finished so that the aperture surface 42 is as nearly optically flat as possible, and so that the end of the projection 43 forms as a lens (in this case a hemisphere) that is as optically accurate as possible. As the optical accuracy is increased, the accuracy of the light waves will also be increased. Likewise, the surfaces of the notches 45a, 45b should be as flat and accurate as possible so as to position the reflecting prism 50 as accurately as possible.

FIGS. 6a, 6b, and 6c show top, front and side views respectively of the reflecting prism 50. The prism 50 may also be made of a suitable material such as a stable plastic like plexiglass. The reflecting surfaces 51a, 51b should be as optically flat as possible, and coated with the most efficient reflector possible. In addition, the angle that these surfaces 51a, 51b form should be as accurate as possible so that the light waves are accurately reflected.

Referring back to FIGS. 1 and 2, when my optical system is positioned and operated in the facsimile scanner 10, the mirrors 17a, 17b illuminate a precise spot or area on the document being scanned. The housing 30 and its optical members are fixed in position with respect to the mirrors 17a, 17b. Light reflected from the illuminated spot is transmitted by the pickup lenses 19 of FIG. 1 in the direction indicated by the arrows 70 of FIG. 2 through the openings 34b, 47b (or 34a, 47a) to the reflecting surface 51b (or 51a) in the direction indicated by the arrows 71 toward the aperture surface 42. At the aperture surface 42, the light is bent in the direction indicated by the arrows 72 toward the hemispherical surface of the projection 43. At this surface, the light is bent in the direction indicated by the arrows 73 to a focal point of the surface. The light sensitive device 18 is positioned in a stationary manner at the focal point for converting the light energy to electrical signals.

It will thus be seen that my invention provides a new and improved optical system for use in facsimile scanners. While my system is relatively simple in construction, it may be made of molded plastic parts that may have sufficient accuracy to require no further machining or grinding. However, if the parts do require further modification, this may be easily achieved by known machining techniques. The parts are easily and quickly assembled in their housing to provide a structure which is rigidly held together in an accurate relation, and which provides long periods of accurate service. The assembled optical system may be easily checked on a jig or other apparatus at the factory, after which it may be used as a new unit or a replacement unit with the assurance that it will perform within the desired accuracy tolerances. If for some reason the parts do become misaligned or broken, they may be easily replaced in the field by substituting appropriate parts in the housing 30, or by substituting a complete housing with the lens member 40 and the reflecting prism 50 already mounted. While I have shown only one embodiment of my invention, persons skilled in the art will appreciate that modifications may be made. For example, the dimensions and shape of the optical lens member 40 may be varied to provide different focal lengths. The aperture surface 42 may be provided with an opaque mask around a suitable outer portion. The angles of the reflecting surfaces 51a, 51b may be varied. This may be necessary to accommodate a lens member 40 and a reflecting prism 50 which have an index of refraction different from plexiglass. The angles of the V-shaped notches 45a, 45b in the lens member 40 should conform with the angles of the reflecting surfaces 51a, 51b so that the reflecting prism 50 is securely held by the lens member 40. The relative diameters of the bore 32, the lens member 40, and the reflecting prism 50 should provide a snug fit when the lens member 40 and the prism 50 are positioned in the bore 32. With respect to the reflecting prism 50, the angle of the reflecting surfaces 51a, 51b should be such that there is no chance of light being refracted instead of reflected. The exact shape and dimensions of the openings 47a, 47b in the lens member 40 and the openings 34a, 34b in the housing 30 may also be varied. Therefore, while my invention has been described with reference to a particular embodiment, it is to be understood that modifications may be made without departing from the spirit of the invention or from the scope of the claims.

I claim:

1. An improved optical scanner for use in facsimile apparatus having a platen for receiving and holding a document to be scanned, having a rotating member that rotates about a longitudinal axis for producing a moving spot of light on the document to be scanned, and having a light sensitive device for receiving light and producing an electrical signal therefrom, said optical scanner comprising:
  a. a housing adapted to be mounted on said rotating member of said scanner;
  b. said housing having a cylindrical bore centered on said longitudinal axis and extending from one end through said housing to the other end, and said housing having a first light opening extending radially outward from said bore and through an outer surface of said housing;
  c. a cylindrical lens member positioned in said bore of said housing;
  d. said lens member having an internal opening extending from one end along said longitudinal axis toward the other end but terminating at an aperture surface that lies in a plane that is substantially perpendicular to said longitudinal axis, having a projection at said other end that forms a convex focusing lens centered on said longitudinal axis for focusing light impinging on said aperture surface at a selected location on said longitudinal axis for utilization by said light sensitive device, having a first light opening extending radially outward from said internal opening to said first light opening in said housing, and having a pair of positioning notches in said one end, said positioning notches being oriented along a diameter of said lens member;
  e. a cylindrical reflecting member positioned in said bore of said housing, said reflecting member being positioned in said positioning notches of said lens member and having a first reflecting surface oriented to reflect light passing through said first light opening of said housing and said first light opening of said lens member toward said aperture surface: and
  f. means for retaining said reflecting member in said bore and thereby retaining said lens member in said bore.

2. The improved optical scanner of claim 1, and further comprising means positioned in said bore of said housing for engaging said lens member and holding said lens member and thereby said reflecting member in a fixed position in said housing.

3. The improved optical scanner of claim 1 wherein said housing has a second light opening extending radially outward in the opposite direction from said first light opening through the diametrically opposite outer surface of said housing, wherein said lens member has a second light opening extending radially outward in the opposite direction from said first light opening to said second light opening in said housing, and wherein said reflecting member has a second reflecting surface symmetrically oriented with respect to said first reflecting surface to reflect light passing through said second light opening of said housing and said second light opening of said lens member toward said aperture surface.

4. The improved optical scanner of claim 3, and further comprising means positioned in said bore of said housing for engaging said lens member and holding said lens member and thereby said reflecting member in a fixed position in said housing.

5. The improved optical scanner of claim 4 wherein said internal opening of said lens member is substantially cylindrical in shape and is symmetrically positioned about said longitudinal axis.

6. An improved optical scanning arrangement for facsimile transmitting apparatus having a yoke structure that is adapted to rotate about an axis, said optical scanning apparatus comprising:
  a. a housing carried by said yoke and having a first bore coaxial with said axis and extending from one end of said housing to the other end of said housing, said housing having a second bore extending angularly from said first bore to a side of said housing;
  b. an optical lens having an aperture at one end and a convex focusing surface at the other end and positioned in a predetermined axial position in said first bore of said housing with said one end of said lens facing said one end of said housing and with said other end of said lens facing said other end of said housing so that light striking said aperture of said lens is focused at a selected axial location with respect to said housing;
  c. an optical reflector member having a first reflecting surface, said reflector member being positioned in said first bore of said housing in spaced relation to said one end of said lens and with said reflecting surface so located with respect to said second bore of said housing that light entering said housing via said second bore is reflected by said first reflecting surface toward said aperture of said lens;
  d. means nonrotatively and nonaxially movably mounted in said first bore between said lens and said optical reflector member and nonrotatively and abuttingly engaging said optical reflector member on the side thereof facing said lens; and
  e. retaining means carried by said housing and engaging said reflector member on the side thereof facing away from said lens.

7. The improved scanning arrangement of claim 6 wherein said second bore of said housing extends along a line that is substantially perpendicular to the axis of said first bore.

8. The improved scanning arrangement of claim 6 wherein said housing has a third bore extending from said first bore to another side of said housing, and wherein said optical reflector member has a second reflecting surface, said second reflecting surface of said optical reflector member being so positioned with respect to said third bore of said housing that light entering said housing via said third bore of said housing is reflected by said second reflecting surface toward said aperture of said lens.

9. The improved scanning arrangement of claim 8 wherein said second and third bores of said housing have a common axis that is substantially perpendicular to the axis of said first bore.